April 3, 1934.  G. R. BAKER ET AL  1,953,740
APPARATUS FOR COATING CONFECTIONERY
Filed March 14, 1931
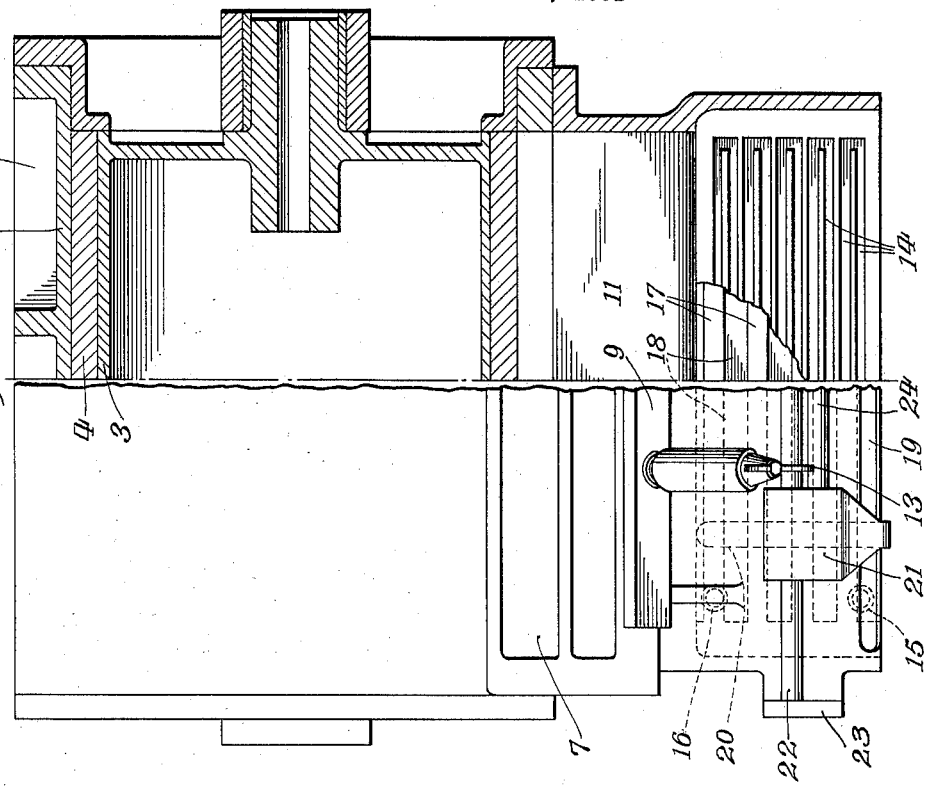
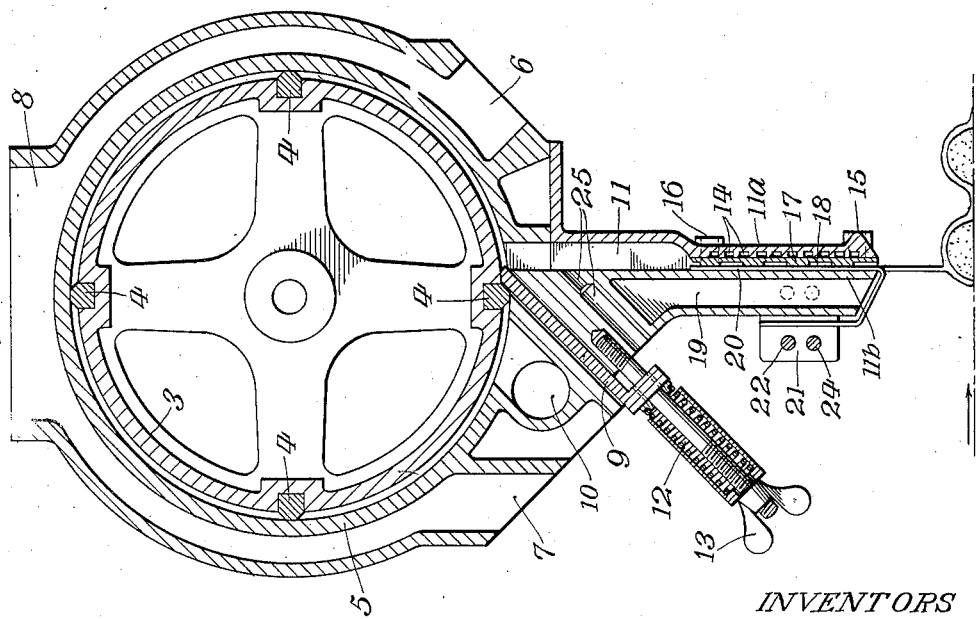
INVENTORS
GEORGE RALPH BAKER
GEORGE DONALD WILSON
BY George B Willcox
ATTORNEY Patented Apr. 3, 1934

1,953,740

UNITED STATES PATENT OFFICE 1,953,740

APPARATUS FOR COATING CONFECTIONERY

George Ralph Baker and George Donald Wilson, London, England, assignors to Baker Perkins Company, Inc., Saginaw, Mich., a corporation of New York Application March 14, 1931, Serial No. 522,581
In Great Britain March 19, 1930

9 Claims. (Cl. 257—89)

This invention relates to the coating of confectionery and the like with chocolate or similar coating material (hereinafter referred to as "chocolate") as described in U. S. Letters Patent No. 1,737,447 by the employment of a stratified chocolate coating or curtain of which one portion or side—that adapted to constitute the outside of the coated goods—is in a grained or partly crystallized condition.

The object of the present invention is to provide an improved means of treatment whereby the operation may be more accurately controlled and the production of a high quality of finished goods may be insured.

According to the invention tempered chocolate (that is to say, chocolate subjected to a controlled temperature treatment appropriate for coating purposes) is conveyed under pressure in an enclosed layer of a thickness approximating or corresponding to the required thickness of the curtain for coating purposes, and while in the enclosed transit is subjected to a cooling treatment on one side adapted to promote graining or partial crystallization at that surface which is adapted to constitute the outside of the coating of the goods, the cooling operation being preferably carried out in the presence of a zone or zones of solid chocolate, or chocolate in a condition adapted to "start" or promote the graining or crystallization of the layer under treatment.

The invention also consists in the provision of a rotary pumping device conveying or passing the chocolate in an enclosed layer while treating one or both sides of the layer to a cooling or tempering action.

The hot chocolate is supplied to the rotary pumping device, which acts as a forced-feed device which is also adapted to cool the chocolate, so that the chocolate is tempered while it is being conveyed.

A further feature of the invention lies in applying a tempering or cooling treatment to the chocolate from a side corresponding to that which is to constitute the grained or crystalline outside surface of the goods. To this end a pumping device is provided through which the chocolate passes in a layer (or in a procession of layers) with one face exposed to a cooling or tempering surface such as that provided by a water jacket.

In the accompanying drawing which illustrates by way of example a chocolate-coating device according to the invention, Fig. 1 is a transverse sectional view, while Fig. 2 is a corresponding side elevation, partly in section.

In carrying the invention into effect according to one convenient mode, by way of example, a rotary pumping device is provided to which a supply of hot chocolate from a suitable re-conditioning source is fed. The rotary pumping device comprises a drum (3) having a plurality of narrow radial blades (4) extending across the face of the drum parallel with the axis of rotation. The drum is rotatably mounted within a jacketed cylinder or casing (5). The clearance between the drum surface and the jacketed casing is such that the chocolate supplied thereto is treated in a comparatively thin layer which need not be substantially greater than twice the thickness of the desired curtain for treating the goods.

The jacketed casing is provided with inlet and outlet connections (6) and (7) respectively for the circulation of cooling or tempering water, while at the upper part a connection (8) is provided adapted to be closed by a cover plate (not shown) which preferably has mounted thereon a temperature regulating device, whereby the cooling water may be maintained at the requisite temperature.

The blades or vanes (4) are bevelled and a resiliently mounted sliding abutment (9) is provided in the lower or six o'clock position (Figure 1). The blades or vanes (4) are adapted to propel the chocolate and at the same time are so formed that they act as scrapers on the internal surface of the cylinder or casing (5) so that they progressively remove any film which may settle upon the surface. This abutment is depressed by contact of the bevelled faces of the vanes, allowing such to pass, whilst immediately sealing the clearance between the drum and the jacket after a vane has passed.

The abutment is provided with a returning spring (12), the tension of which may be adjusted by the thumb nut (13).

On the advance side of the abutment member an inlet (10) is provided for the hot chocolate whilst on the rearward side of the abutment a conduit member (11) is provided which is adapted to receive and enclose the layer of chocolate as delivered towards the abutment by the vanes. It will thus be appreciated that the rotation of the vanes (4) causes the chocolate issuing from the inlet (10) to make almost a complete circuit in contact with the cooling jacket (5) before such is discharged under pressure to the conduit.

The inlet (10) is supplied from a pump adapted to deliver an excess feed of chocolate, the excess quantity being returned to the pump or reservoir, thus ensuring that a solid stream of chocolate without air is delivered to the rotary pumping device.

The conduit (11) may be arranged parallel to the vertical diametric plane of the drum and is disposed in close proximity thereto. The conduit extends across the width of the drum and its length (outwardly from the drum) is substantial, that is to say, it is of sufficient length to enable the chocolate passing therethrough to be subjected to a thorough graining or crystallizing effect. The upper end of the conduit may be slightly enlarged in order to hold a supply or reserve of chocolate as delivered by the drum. The lower half or portion of the conduit is restricted to afford a narrow clearance such as to cause the chocolate to travel in a thin layer, approximating or corresponding in thickness to that of the desired curtain to be produced.

One wall (11a) of the conduit at the lower end thereof, is provided with a cooling contrivance and the opposite wall (11b) with a means for heating or maintaining the temperature of the chocolate adjacent that wall at a temperature corresponding with or approximating to the tempered condition.

Thus the cooling wall (11a) of the conduit may be provided with serpentine or zigzag passages (14) through which cooling water may be circulated through the inlet (15) and outlet (16). This cooling face, instead of being in direct contact with the chocolate, may cool the same through the medium of what may be termed a graining plate, that is to say, a plate (17) having a pocket, or a series of pockets (18) therein in which chocolate is adapted to collect in a solid form or in a form which has been found to act upon the chocolate under the treatment as a "starter" for the desired graining or crystalline condition.

The other wall (11b) of the conduit may be heated by the provision of a recess (19) (or a plurality thereof) adapted to contain electric heaters. Any other form of device for heating this wall may be employed. Alternatively, the heating of the wall (11b) may be dispensed with. Instead it may be insulated to prevent loss of heat, and the opposite wall 11a may be cooled by the atmosphere alone.

For the purpose of preliminarily or periodically cleaning or removing obstructions from the clearance in the lower part of the conduit through which the chocolate passes in a thin layer, a finger or wire (20) may protrude into the clearance and at its lower end be mounted upon a laterally disposed support (21) capable of being traversed from side to side of the conduit (11) or in a direction parallel to the axis of the rotating drum. The support (21) is mounted on a guide bar (22) carried by end brackets (23) and is provided with a rod (24) by which it may be traversed as desired.

The conduit (11) preferably towards its upper end, is provided with a series of vents (25) through which a certain proportion of the chocolate is allowed to drain or flow. These vents ensure that there is a continuous flow from the outlet of the conduit throughout the operation of the device and prevent any tendency of interruption due to the momentary passage of the vanes across the upper mouth of the conduit.

In operation, the hot chocolate is carried in contact with the jacketed wall (5) by the vanes (4) of the drum so that it is subjected to a tempering action and forced or passed under pressure into the graining conduit (11). It is preferred that the rotating drum should not have an internal cooling jacket; thus the chocolate lying against the surface of the drum may be at a slightly higher temperature than that against the cooled jacket wall (5). Moreover, the drum discharges to the conduit (11) so that the side of the chocolate which has lain towards the jacket as delivered by the conduit lies towards the cooled side thereof. This arrangement has the advantage that the chocolate is to a certain extent given a predisposition to graining during the tempering stage.

The chocolate is delivered from the lower end of the graining conduit (11) as a curtain which may fall or flow directly onto the goods, or it may be led upon an inclined plate or slide before discharging over the goods.

Although the conduit device for enclosing a graining layer of chocolate has herein been described as located in a vertical plane, this is not essential, as the conduit may be disposed angularly or at an incline.

Details of construction of the apparatus described herein may be altered without departing from the spirit of the invention. For example, the abutment partition (9) may be omitted if the inlet (10) and the outlet (11) are spaced apart a distance greater than that between two successive vanes (4). In this case the pumping and tempering device is simply given enough surplus capacity so that even if a certain amount of chocolate might be carried past the outlet (11), a sufficient quantity would flow through the outlet to maintain a proper coating curtain.

Also, the method of cooling a wall of the cylindrical chamber may be varied. For instance, the inner drum (3) might be cooled sufficiently merely by the circulation of air at room temperature while the outer casing (5) could be insulated or water-jacketed to keep it warmer. Alternatively, the arrangement might be reversed.

Further, the important advantages of a uniform and unvarying tempering of all of the chocolate to be applied to the goods can still be obtained with my device if both the casing (5) and the drum (3) are cooled to the same temperature. The condition of the chocolate in the coating curtain is much more uniform and can be much more quickly changed than is the case when the curtain is drawn from a tempering tank holding a large volume of chocolate.

Having thus described our invention, what we claim and desire to secure by Letters Patent is:

1. In a machine for coating confections with chocolate, a pumping and tempering device for delivering melted chocolate to the goods to be coated, comprising a cylindrical casing, a cylindrical drum rotatably mounted within and coaxial with said casing, the external diameter of said drum being less than the internal diameter of said casing so that the opposed surfaces define an annular chamber, spaced vanes on said drum extending from end to end thereof to contact with the inner surface of said casing, an inlet to and an outlet from said annular chamber spaced apart circumferentially of said casing, a displaceable partition mounted on said casing between said inlet and outlet extending the length of said drum and arranged to contact with the face of said drum except during the passage of one of said vanes, and means for cooling one or both of said chamber-defining surfaces.

2. In a machine for coating confections with chocolate, a pumping and tempering device for delivering melted chocolate to the goods to be coated, comprising a cylindrical casing, a cylindrical drum rotatably mounted within and co-axial with said casing, the external diameter of said drum being less than the internal diameter of said casing so that the opposed surfaces define an annular chamber, spaced vanes on said drum extending from end to end thereof to contact with the inner surface of said casing, an inlet to and an outlet from said annular chamber spaced apart circumferentially of said casing, said drum and vanes operative to impel chocolate from said inlet to said outlet, and means for cooling one or both of said chamber-defining surfaces.

3. Apparatus for the production of a curtain of melted chocolate for coating confections, comprising in combination a pump for delivering coating material under pressure, a curtain-forming conduit communicating with the outlet of said pump, said conduit having parallel walls spaced apart approximately the thickness of the curtain to be formed and of substantial length, and means for maintaining one of said walls cooler than the other.

4. Apparatus for the production of a curtain of melted chocolate for coating confections, comprising a curtain-forming conduit leading from a source of chocolate, said conduit having parallel walls spaced apart approximately the thickness of the curtain to be formed and of substantial length, and means for maintaining one of said walls cooler than the other.

5. Apparatus as claimed in claim 4 wherein the inner surface of the cooler wall of the curtain-forming conduit is provided with one or more recesses for retaining partly or wholly solidified chocolate, clearing means is placed within the conduit, and means is provided for traversing said clearing means from side to side of the conduit.

6. Apparatus as claimed in claim 4, wherein the upper part of the curtain-forming conduit is provided with one or more vents through which a portion of the chocolate is allowed to drain.

7. In apparatus for the production of a curtain of melted chocolate for coating confections, a curtain-forming conduit of substantial length and means for maintaining at different temperatures the two walls thereof which come in contact with the faces of said curtain.

8. In apparatus for use in the production of a curtain of chocolate for coating confectionery, a rotary pump comprising a cylindrical chamber, a cylindrical drum of less diameter than the chamber concentrically mounted for rotation within said chamber, and a plurality of vanes mounted on said drum to extend from end to end thereof and adapted to scrape the inner wall of the chamber and cause the chocolate to pass in a procession of inert layers around the periphery of the chamber, the spacing of said drum from said wall being approximately the thickness of the curtain ultimately produced, and means for tempering the wall of said chamber.

9. Apparatus as claimed in claim 7 wherein means is provided for heating one wall of the conduit and means is provided for cooling the opposite wall.

GEORGE RALPH BAKER.
GEORGE DONALD WILSON.